United States Patent [19]

Bakal

[11] Patent Number: 4,572,836
[45] Date of Patent: Feb. 25, 1986

[54] STABILIZED EDIBLE HERB COMPOSITION AND METHOD

[75] Inventor: Abraham I. Bakal, Parsippany, N.J.

[73] Assignee: Gourmeta, Inc., Winnetka, Ill.

[21] Appl. No.: 675,951

[22] Filed: Nov. 28, 1984

[51] Int. Cl.⁴ ............................................. A23L 1/221
[52] U.S. Cl. .................................... 426/321; 426/613; 426/638
[58] Field of Search ........................ 426/638, 613, 321

[56] References Cited

U.S. PATENT DOCUMENTS 3,594,194  7/1971  Ricci .................................. 426/638

FOREIGN PATENT DOCUMENTS 51-007158  1/1976  Japan .................................. 426/638
2014429    8/1979  United Kingdom .

OTHER PUBLICATIONS

Rietz et al., A Guide to the Selection, Combination & Cooking of Foods, vol. II, 1965, Avi: Westport, Conn., pp. 358-359.
Lust, The Herb Book, 1974, Benedict Lust Publications: New York, p. 3.
Bensted et al., Pickle & Sauce Making, 2nd Ed., 1962, Food Trade Press, Ltd.: London, pp. 248-253.

Primary Examiner—Joseph Golian

[57] ABSTRACT

An edible sterilized herb composition is provided which is in the form of a puree or paste and is stabilized to retain fresh flavor and color even after prolonged periods of storage and includes one or more herbs, less than about 7.5% by weight salt to stabilize the composition, edible acid to control pH, preferably ascorbic acid to minimize color oxidation, and an edible oil as a lubricant. A method for preparing the above-described shelf-stable herb composition is also provided.

11 Claims, No Drawings

STABILIZED EDIBLE HERB COMPOSITION AND METHOD

FIELD OF THE INVENTION

The present invention relates to a shelf-stable sterile edible herb composition in the form of a herb puree or paste which retains the natural flavor and color of fresh herbs even upon prolonged periods of storage.

BACKGROUND OF THE INVENTION

Edible herbs are derived from a family of plants which are commonly referred to as herbs and spices and are used as flavorants in foods and food preparations.

Fresh herbs, such as parsley, oregano, garlic and the like add much desired flavor to many foods. However, they are only available on a seasonal basis and have a limited shelf-life, since they are very prone to spoilage. To overcome problems of seasonal availability and limited shelf-life, herbs are usually dehydrated and available in a dry form. Several drying methods have been employed to carry out dehydration of fresh herbs, namely, air drying, vacuum drying, and freeze drying. Unfortunately, it has been found that during such drying processes, the natural flavor of the herbs may be altered and sometimes even severely diminished. Furthermore, dehydrated herbs undergo oxidation during storage resulting in discoloration and further alteration or loss of flavor. Oxidation of dehydrated herbs during storage has been somewhat curtailed by use of undesirable chemical antioxidants which may also detract from the natural herb flavor.

U.K. Pat. No. 2,014,429B describes several prior art techniques for preserving herbs in a dry state including pasteurizing or sterilizing which, this patent indicates, results in denaturation of the taste and of the color; and preserving herbs in an acid environment, such as vinegars or other acid food products, which results in decomposition of the chlorophyll in the treated herbs and thus considerable modification of color. This U.K. patent indicates that the disadvantages associated with the afore-described prior art herb preservation techniques may be overcome by preserving herbs at ambient temperature, without heat treatment, without using chemical preservatives and without modification of acidity. This is accomplished by adding large amounts of wetting agent, such as sodium chloride, glycols, such as 1,2-propylene glycol, glycerol and sugars, such as sucrose and sorbital and optionally edible oil. The wetting agent gives the herbs a water activity of less than 0.90. The water activity represents the availability of water present in the herbs for participating in chemical and biological processes, so that the number of germs present during preserving, which may affect organoleptic quality of the herbs, is reduced as water activity is reduced. Furthermore, in Example 4, this U.K. patent shows that an unsterilized herb composition which contains 10% salt has an acceptable water activity of 0.85 so that it retains organoleptic qualities after a years' preservation at 25° C., while in Example 5, an unsterilized herb preparation which contains only 5% salt has an unacceptable water activity of 0.94 and unacceptable stability in flavor and color after only 3 months' storage.

Although the herb compositions described in the U.K. patent are stable over long periods of time due to the presence of relatively large amounts of wetting agent, such as sodium chloride, glycols or glycerol, the flavor of the herb preparations is likely to be altered due to the presence of such large amounts of such wetting agents. Accordingly, these herb preparations will not be normally used as a spread.

Thus, a stable sterile herb composition which is available all year round and retains its flavor even after prolonged periods of time and which can even be used in food spreads would be a most welcomed addition to the food preparation industry.

DESCRIPTION OF THE INVENTION

In accordance with the present invention, a herb composition is provided which is in sterile, pasteurized form, free of synthetic chemicals such as alkylene glycols, and large quantities of salts, but still substantially retains the flavor and color of the fresh herb, and is stable over prolonged periods of storage. This is indeed surprising and unexpected inasmuch as U.K. Pat. No. 2,014,429B indicates that, until now, herb preparations which have been subjected to pasteurization or sterilization undergo flavor and color modification and that herb preparations containing 5% salt, which is not sterilized, becomes unconsumable after 3 months in that its color yellows, its aromatic strength is attenuated and there is the appearance of rancid and oxidized tastes.

The stable pasteurized herb composition of the invention which has substantially the same flavor, taste and color as the corresponding fresh herb is achieved without employing large quantities of wetting agents, but by careful size reduction of the herb plant and by a controlled pasteurization or sterilization technique of a mixture of herbs, edible acid, edible oil and relatively small amounts of salt as will be described in more detail hereinafter.

The herb preparation of the invention will preferably take the form of a puree or paste and will contain one or more herbs, one or more edible oils, one or more edible acids, less than 7.5% by weight of one or more edible salts, and optionally, a natural color preservative or antioxidant, such as ascorbic acid.

Further in accordance with the present invention, a method is provided for preparing a stable sterile herb composition which substantially retains its flavor, taste, and color over prolonged periods of storage, which method includes the steps of providing the appropriate herbs, washing the herbs, if necessary, subjecting the herbs to size reduction to reduce the herbs to an average particle size of less than about 600 microns, but so that is passes through a 20 mesh screen, adding salt, acid and oil to the herbs and then heating the resulting mixture to a temperature of at least about 80° C. for at least about 10 minutes to pasteurize the herb composition which in its final form will be in the form of a paste or puree. Such an herb composition prepared in accordance with the method of the invention may be stored up to 6 months or more at 100° F. and 1.5 years or more at room temperature without significant change in flavor, taste and color.

In carrying out the method of the invention, the size reduction step is essential to achieve proper flavor in the final product. Thus, in a preferred size reduction technique, washed herbs will be cut using a conventional cutting machine, such as a Fitzpatrick mill or meat grinder to form pieces of herb of a magnitude of less than 1300 microns in size so that they pass through a 10 mesh screen. Thereafter, the pieces of herb are further reduced in size using a colloid mill or silent cutter to form particles of herb of average size of less than about 600 microns and preferably from about 300 to about 200 microns, so that they pass through a 40 mesh screen but preferably not through an 80 mesh screen. The second size reduction operation is preferably carried out for a period ranging from about ½ minute to about 10 minutes and more preferably from about 1 to about 5 minutes to allow for flavor development through enzymatic activity.

If desired, a small portion of the total oil to be present in the final herb composition may be added to the herbs during the size reduction operation. For example, after the herbs are cut to the desired piece size and before the herb pieces are subjected to milling or other fine particle size reduction operation, from about 50 to about 100% by weight of the total oil to be present in the final composition may be added as a lubricant during size reduction.

After the desired particle size range is achieved, the edible salt, edible acid and balance of edible oil are added with mixing to create a paste. The mixture may then be pasteurized or sterilized to stabilize same. This may be accomplished by adding the oil heated at from about 120° to about 250° C. and then maintaining the mixture at from about 80° to about 95° C. for a period of from about 10 to about 0.2 minutes. Alternatively, the oil (without first being heated) may be added to the herbs together with the other ingredients and the total mixture mixed and heated as described above.

Mixing during heating of the herb mixture is important to insure that all herb particles are sterilized. The mixing operation may be carried out using appropriate mixing equipment such as a scraped surface heat exchanger or a screw mixer.

After the herb mixture is sterilized, it is filled into containers, sealed, inverted and cooled.

The final herb composition of the invention will contain one or more herbs in an amount within the range of from about 30 to about 70% and preferably from about 40 to about 65% by weight of the herb composition. Herbs which may be employed in the herb composition of the invention include any one or more of those which are normally referred to as culinary herbs such as basil, parsley, oregano, rosemary, sage, lovage, dill-weed, tarragon, marjoram, thyme, mint, chervil, coriander, sorrel, savory, garlic, chives, onion, and the like.

Edible oils which are an essential part of the herb composition of the invention and which serve as a lubricant will be present in an amount within the range of from about 25 to about 70% and preferably from about 25 to about 50% by weight of the final herb composition and will be employed in a weight ratio to herb, prior to pasteurization, of within the range of from about 0.1:1 to about 1.5:1 and preferably from about 0.2:1 to about 1:1. Examples of edible oils suitable for use in the herb composition of the invention include, but are not limited to corn oil, sunflower oil, soybean oil, peanut oil, sesame oil, safflower oil, olive oil, cottonseed oil, almond oil, avocado oil, palm oil or cod liver oil.

The edible acid will be employed to reduce the pH of the herb composition to a level preferably below 4.5 and more preferably below about 4 to reduce enzymatic activity and thereby increase product stability. The edible acid will usually be present in an amount within the range of from about 0.1 to about 0.7% and preferably from about 0.2 to about 0.5% by weight of the final herb composition and will be employed in a weight ratio to herb, prior to pasteurization, of within the range of from about 0.0015:1 to about 0.02:1 and preferably from about 0.003:1 to about 0.013:1. Examples of edible acids suitable for use herein include, but are not limited to, citric acid, malic acid, tartaric acid, hydrochloric acid, phosphoric acid and the like.

As indicated hereinbefore, the salt is employed to impart product stability and flavor preservation to the final herb composition. However, the salt will be employed in relatively small amounts of less than about 7.5% by weight of the final herb composition and preferably in amounts of within the range of from about 2 to about 5% by weight of the final composition and in a weight ratio to herb, prior to pasteurization, of within the range of from about 0.03:1 to about 0.2:1 and preferably from about 0.07:1 to about 0.15:1. Examples of salts suitable for use herein include sodium chloride, potassium chloride, calcium chloride and mixtures thereof. In any event, the amount of salt employed will be substantially less than that amount which will cause alteration of the taste or flavor of the natural herb.

If desired, the herb composition of the invention may contain ascorbic acid or other preservatives, such as sodium benzoate, benzoic acid, potassium sorbate or sodium sulfite and combinations thereof. Where employed, the ascorbic acid (to inhibit color oxidation) or other preservative will be present in an amount of within the range of from about 0.05 to about 0.3% and preferably from about 0.05 to about 0.2% by weight of the final herb preparation and in a weight ratio to herb, prior to pasteurization, of within the range of from about 0.0007:1 to about 0.004:1 and preferably from about 0.0008:1 to about 0.006:1.

Preferred herb compositions of the invention are set out below.

| Ingredient | Parts by Weight in Final Product |
| --- | --- |
| Herb | 40 to 65 |
| Edible oil | 25 to 50 |
| Salt | 2 to 7.5 |
| Edible acid | 0.2 to 0.5 |
| Preservative | 0.05 to 0.2 |

The following Examples represent preferred embodiments of the present invention. All temperatures are express in degrees Centigrade unless otherwise indicated.

EXAMPLE 1

A parsley paste preparation in accordance with present invention having the following composition was prepared as described below.

| Ingredient | Parts by Weight |
| --- | --- |
| Parsley | 63 |
| Corn oil | 31.5 |
| Sodium chloride | 5 |
| Citric acid | 0.2 |
| Ascorbic acid | 0.15 |

Fresh parsley (1,000 g) was harvested, thoroughly washed in running cool water, and then cut into pieces of about 1,000 microns average size. The cut pieces of parsley were then further reduced in particle size in a silent cutter for about 5 minutes to an average size of about 500 microns. Thereafter, 50 g sodium chloride, 2 g citric acid, and 1.5 g ascorbic acid were mixed with the particulate parsley. After about 2 minutes of mixing, 315 g corn oil heated to 150° C. were added. The mixture was then filled in jars, heated to 90° C. for 2 minutes and then cooled and stored.

The final parsley product in the form of a paste was found to be very stable and had a total bacterial count of below 5 colonies per gram. It was judged as having bright green color and fresh parsley flavor and when used in food preparations was indistinguishable from fresh parsley. The parsley paste remained stable in color and flavor even after prolonged storage of 120 days at 35° C.

EXAMPLE 2

A rosemary puree in accordance with the present invention having the following composition was prepared as described in Example 1.

| Ingredient | Parts by Weight |
|---|---|
| Rosemary | 53 |
| Corn oil | 42.4 |
| Sodium chloride | 4.2 |
| Citric acid | 0.3 |
| Ascorbic acid | 0.1 |

The resulting rosemary puree was judged as having excellent color and typical fresh herb flavor and was highly stable during storage over periods of 160 days at 35° C.

EXAMPLE 3

A garlic paste in accordance with the present invention having the following composition was prepared as described in Example 1.

| Ingredient | Parts by Weight |
|---|---|
| Garlic | 68 |
| Corn oil | 27 |
| Sodium chloride | 4.5 |
| Citric acid | 0.3 |
| Ascorbic acid | 0.14 |

The resulting garlic paste was found to have an excellent white color, a creamy texture and typical fresh garlic flavor and excellent stability even after prolonged storage at 100° F.

It will be appreciated that following the procedure as described herein and in Example 1, other herb purees and pastes containing any of the herbs, edible oils, salts and acids described above may be prepared in accordance with the present invention.

What is claimed is:

1. A stabilized pasteurized edible herb composition consisting essentially of one or more edible herbs in particulate form having an average particle size of less than about 600 microns, in an amount within the range of from about 30 to about 70% by weight, said herb selected from the group consisting of garlic, chives, basil, parsley, oregano, rosemary, sage, lovage, dillweed, tarragon, marjoram, thyme, mint, chervil, coriander, sorrel, savory, onions or mixtures thereof, an edible salt selected from the group consisting of sodium chloride, potassium chloride or mixtures thereof to reduce enzymatic activity of the herbs and impart stability and flavor preservation, in an amount within the range of from about 2 to about 5% by weight, an edible acid selected from the group consisting of citric acid, malic acid, tartaric acid, hydrochloric acid, phosphoric acid or mixtures thereof in an amount within the range of from about 0.1 to about 0.7% by weight to reduce the pH of the herb composition to below 4.5, and an edible oil as a lubricant to impart a paste-like consistency in an amount within the range of from about 25 to about 70% by weight, all of the above % being based on the weight of the herb composition.

2. The composition as defined in claim 1 wherein said salt is sodium chloride.

3. The composition as defined in claim 1 wherein said oil is present in an amount within the range of from about 25 to about 50% by weight of the composition.

4. The composition as defined in claim 1 wherein said herb is present in an amount within the range of from about 40 to about 65% by weight of the composition.

5. The composition as defined in claim 1 wherein said oil is selected from the group consisting of corn oil, soybean oil, safflower oil, peanut oil, olive oil, sesame oil, sunflower oil, cottonseed oil, almond oil, avocado oil, palm oil or cod liver oil.

6. The composition as defined in claim 1 further including ascorbic acid to inhibit color oxidation.

7. The composition as defined in claim 1 wherein the herb is selected from the group consisting of parsley, rosemary or garlic, the salt is sodium chloride, the oil is corn oil and the acid is citric acid.

8. A method for forming the stabilized edible herb composition as defined in claim 1, which comprises reducing the average particle size of said herb to less than about 600 microns, adding salt and acid to the particulate herb to form a herb mixture, adding said edible oil thereto, and pasteurizing said herb mixture by maintaining said herb mixture at a temperature of at least about 80° C. for a period of from about 10 to about 0.2 minutes to sterilize the composition.

9. The method as defined in claim 8 further including the step of adding a portion of the edible oil to the herb during said size reduction step.

10. The method as defined in claim 8 wherein said oil is heated to at least about 120° C. prior to being added to the herb mixture.

11. The method as defined in claim 8 wherein the step of reducing the particle size of the herb is carried out for a period of from about 1 to about 5 minutes to allow flavor development through enzymatic activity.

* * * * *